Figure 3:
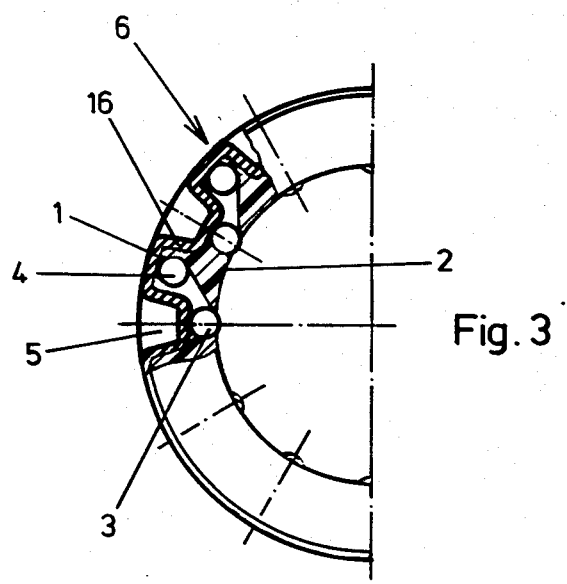

United States Patent [19]
Walter et al.

[11] Patent Number: 4,514,017
[45] Date of Patent: Apr. 30, 1985

[54] ROLLING BEARING FOR LENGTHWISE MOVEMENT

[75] Inventors: Lothar Walter, Schweinfurt; Walter Reith, Bad Bocklet, both of Fed. Rep. of Germany

[73] Assignee: SKF Kugellagerfabriken GmbH, Schweinfurt, Fed. Rep. of Germany

[21] Appl. No.: 471,122

[22] Filed: Mar. 1, 1983

[30] Foreign Application Priority Data

Mar. 3, 1982 [DE] Fed. Rep. of Germany ....... 3207516

[51] Int. Cl.³ .............................................. F16C 29/06
[52] U.S. Cl. .................................................. 308/6 C
[58] Field of Search ...................... 308/6 C, 6 R, 4 R; 464/168

[56] References Cited

U.S. PATENT DOCUMENTS

| 3,940,187 | 2/1976 | Suda | 308/6 C |
| 4,062,602 | 12/1977 | Nilsson | 308/6 C |
| 4,082,374 | 4/1978 | Ernst et al. | 308/6 C |

*Primary Examiner*—Lenard A. Footland
*Attorney, Agent, or Firm*—Daniel M. Rosen

[57] ABSTRACT

A rolling bearing for lengthwise movement has a support formed of sheet metal and having a cross-section that is corrugated in the circumferential direction, so that axially extending channels are provided for the rolling bodies. The cage is comprised of two halves joined together in a radial plane, and having turnaround zones formed therein.

8 Claims, 4 Drawing Figures

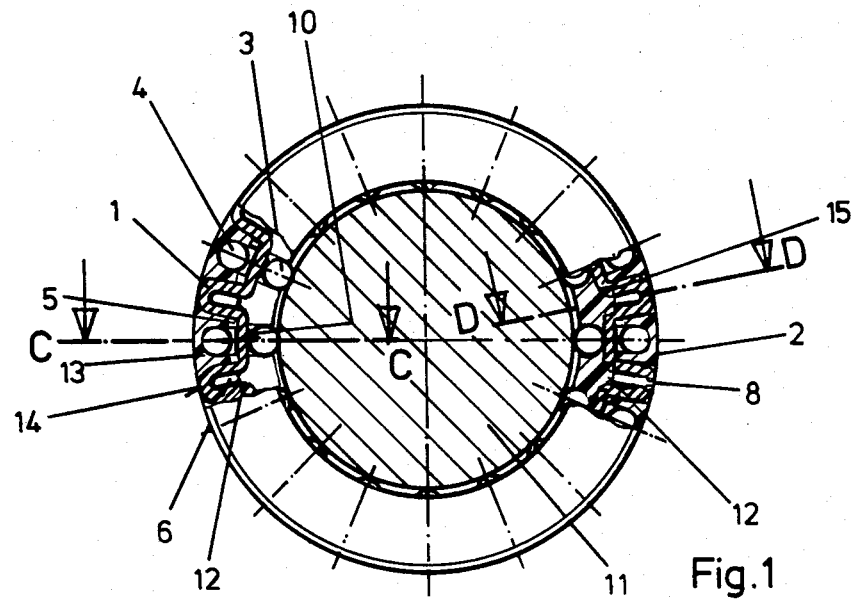
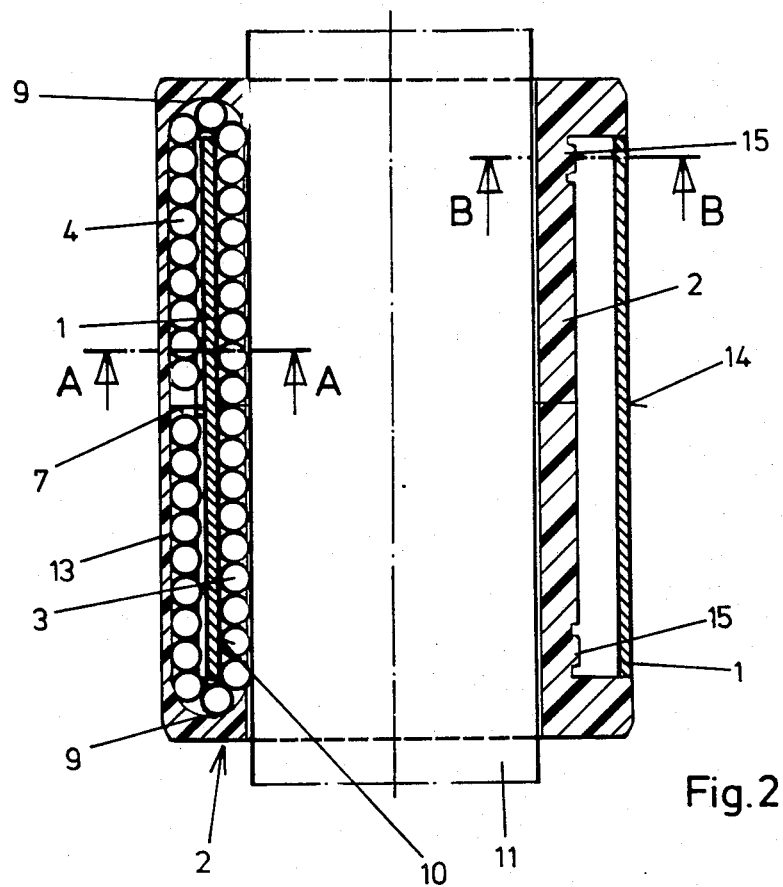

ROLLING BEARING FOR LENGTHWISE MOVEMENT

This invention relates to a rolling bearing for lengthwise movement having endless rows of rolling bodies distributed about its circumference, and comprising a support having axially extending channels in its surface for radially inwardly supporting the loaded rolling bodies, and a cage for guiding the rolling bodies in the return direction and reversing their direction at the end of the support.

A rolling bearing of this type is disclosed for example in U.S. Pat. No. 4,128,279. The support in this arrangement is a solid body and has axially extending guide channels on its outer surface for guiding the unloaded balls. The loaded balls of the endless ball rows are directly radially supported on the bore surface of the support. Although this arrangement functions properly, it has the disadvantage that the support can only be produced by considerable machining. A large amount of waste chips are produced in the broaching of the guide channels, so that there is a high overall material cost.

It is therefore the object of this invention to provide a rolling bearing of the above type which can be economically produced, substantially without waste and by simple means.

This object is achieved by providing axially extending guide channels in the support for guiding the rolling bodies, the channels being produced by a deformation process, so that the support has a corrugated or undulating cross-section in the circumferential direction.

The support can be produced for example from a section of thin wall tube. The deformation of the tube into a ring having circumferentially directed convolutions or undulations in cross-section may be effected for example by sequential stamping of individual axially extending channels for the rolling bodies with the proper spacing, so that they are uniformly distributed about the circumference. Alternatively the channels can be stamped simultaneously by the use of a suitable work tool. The channels extend completely axially throughout the support, so that the support has the same cross-section at each axial position. In a support produced in accordance with the invention, there is advantageously no waste. Moreover there are no special requirements for machine equipment or the like, so that overall economical production may be achieved.

In a further feature of the invention the support is formed of a corrugated or undulating sheet metal band bent to form a ring.

In this arrangement, a pre-cut flat sheet metal band of suitable length is provided with channels by stamping or bending, and then bent into a ring. The bending to form a ring may also occur directly during the production of the channels, by the use of a suitable arrangement for the work tools. The two free ends of the prepared support can be welded if necessary. In many cases, however, the free ends are merely joined together without interconnection, since the support and/or the entire rolling bearing for lengthwise movement may thereby be mounted in a housing without additional preparation. In one embodiment of the invention it is desirable to maintain the diameters of the rolling bearing within a determined range. A gap at the joint position can thereby be used as compensation for the different ball diameters.

In one embodiment of the invention the radially outwardly open channels serve to guide the return of the unloaded rolling bodies and the circumferentially extending radially inward surfaces define the races for the loaded rolling bodies.

The radially outwardly open channels serve as return guides for the unloaded rolling bodies, while the radially inward circumferentially directed sections of the channels, as it were the bases of the channels, support the rolling body rows radially against a shaft or the like with their radially inner surfaces and form the races of the loaded rolling bodies. The radially inwardly open channels produced by stamping of the corrugations or undulations and located between the outwardly open channels can thereby have small opening widths. The outer surface of the radially outer circumferentially extending sections between the individual channels form the outer seating surfaces of the complete rolling bearing for lengthwise movement. In this arrangement the loaded and unloaded rolling bodies of a rolling body row are radially aligned with respect to one another, so that a relatively large number of rolling body rows can be arranged about the circumference of the support by making the otherwise unused radially inwardly open channels correspondingly smaller. The guiding of the rolling bodies is achieved by a cage which has axially extending channels for the loaded balls in the region of the support and prevents them from dropping out. Reversing channels are formed for each rolling body row at the free ends of the cage, the reversing channels guiding the rolling bodies to the channels of the return guides and leading the rolling bodies out of these guides. In addition cage parts may likewise be provided which assist in preventing the rolling bodies from falling out of or into the guides.

In another embodiment of the invention the radially inwardly open channels define the return guiding of the unloaded rolling bodies and the circumferentially directed radially inwardly arranged surfaces of the radially outer open channels define the races for the loaded rolling bodies.

The rolling bodies can consequently run on the radially inner surfaces of the radially inwardly open channels, so that the radial depth of the channels in this case must only be great enough to guide the unloaded rolling bodies at a sufficient distance from the shaft or the like. A correspondingly shaped cage, which guides the rolling bodies, axially reverses the rolling bodies at the free ends of the support, and prevents the rolling bodies from falling out, is consequently preferably arranged only on the inside of the support.

In a further example of the invention the radially inwardly open channels define the guides for the loaded rolling bodies and the radially outwardly open channels define guides for the unloaded rolling bodies.

This embodiment of the rolling body guide in accordance with the invention provides a rolling bearing for lengthwise movement having especially small radial height. The rolling bodies are preferably balls. The radial dimension of the rolling bearing is only slightly greater than the ball diameter plus the sheet metal thickness of the support. The cage is arranged radially outside of the support and forms, for example, an enclosed cover around the entire rolling bearing.

In accordance with a further feature of the invention the cage consists of two parts joined to one another in a radial plane.

In this embodiment of the invention the cage is, for example, separated into two similar halves, which, in several embodiments of the rolling bearing of the invention, can be completely identical. This provides a special advantage in the production of the rolling bearing, especially when the cage is of a plastic material. The reversing zones required at the free ends of the rolling bearing can be formed in a single process step. Affixing of the cage and/or its two halves in the circumferential direction is unnecessary due to the shape of the support in accordance with the invention. Both the inner and outer parts are anchored automatically in the assembly in the channels of the support and moreover prevent opposite rotation of the two parts. As a consequence, reliable operation of the complete rolling bearing is ensured, even though the bearing is economical to manufacture.

In a further embodiment of the invention the cage is provided with radially extending projections engaging recesses in the support.

As a result the parts of the cage form a unitary component with the supports, which is also axially secure.

In accordance with a further feature of the invention opposed holding means, such as pins and bores or the like, are arranged on the joined-together radial surfaces of both parts of the cage.

If in particular applications of the rolling bearing, severe varying stress may occur on the radial separating surface of the cage, axially projecting pins may be provided which engage corresponding recesses in the junction of the two parts. Pins and recesses can alternately be provided so that the identical shapes of the two halves are maintained.

Figure 4:
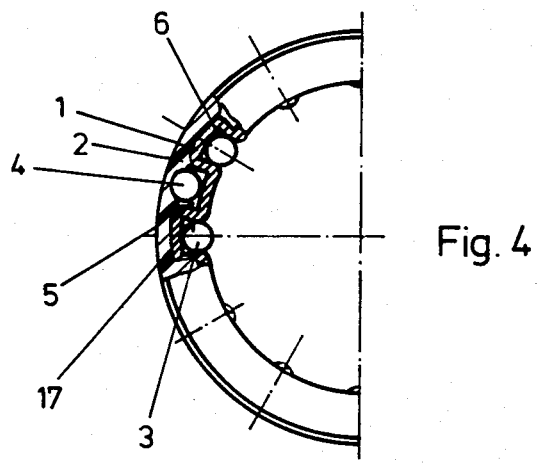

In order that the invention may be more clearly understood, it will now be disclosed in greater detail with reference to the accompanying drawing, wherein FIG. 1 is a cross-sectional view of a ball bearing for lengthwise movement having a corrugated support with the left half showing the section A—A and the right half showing the section B—B of FIG. 2, FIG. 2 is a longitudinal cross-section of the ball bearing illustrated in FIG. 1, with the left half showing the section C—C and the right half showing the section D—D of FIG. 1, FIG. 3 is a partial cross-sectional view of a ball bearing for lengthwise movement having return guides for unloaded balls in the radially inwardly open channels of the support, FIG. 4 is a partial cross-sectional view of a ball bearing for lengthwise movement in which all channels of the support guide balls.

The ball bearing for lengthwise movement illustrated in FIGS. 1 and 2 is comprised of a support 1, a cage 2 having endless rows of balls distributed about its circumference. The reference numeral 3 indicates the loaded balls and the reference numeral 4 indicates the unloaded balls. The support 1 is produced from a flat sheet metal band and is provided with channels 5, 6 extending axially therethrough by stamping or bending, so that it has a corrugated cross-section. The two free ends are joined to one another as illustrated at the reference numeral 8. The cage 2 is comprised of two identical halves of, for example, plastic material, which are joined together at their radial end surfaces.

Turnaround or reversing zones 9 are provided in the region of the free ends of the support 1, these reversing zones 9 being formed in an operation during the production of the halves of the cage 2. The radially inner circumferentially extending surfaces of the support 1 form the races 10 for the loaded balls 3. The cage 2 has axially extending guides at this position which are opened radially inwardly of the ball bearing so that the balls 3 can roll on a shaft 11 or the like for serving their respective functions. Radially extending projections 12 formed on the cage body extend into the radially inwardly opening channels 7 of the support 1 in order to improve the positioning of the cage body with respect to the support 1. The unloaded balls 4 are guided in the reverse direction in the radially outwardly opening channels 5. The cage 2 has an axially directed section 13 at this position which aids in the guiding of the balls 4 in these channels 5 and prevents them from falling out. The radially outer surface, in the circumferential direction of the support 1, is provided for the assembly of the ball bearing, and serves as a seating surface 14. In the assembly of the ball bearing, the two halves of the cage body 2, each provided with balls 3, 4, are slid in the support 1 from both ends thereof. A precise alignment of the individual races is automatically provided by the non-rotatable arrangement of the individual cage sections 12, 13, in the channels 5, 6. In order to ensure that the two halves of the cage 2 cannot be axially slid with respect to the support 1, radially extending projections 15 are formed and circumferentially distributed, thereby the projections 15 engage corresponding recesses of the support 1.

In the embodiment of a ball bearing for lengthwise movement as illustrated in FIG. 3, the radially inwardly opening channels 6 of the support 1 serve as the return guides for the unloaded balls 4. The cage 2 is consequently arranged only in the inside of the support 1. The radially extending sections 16 of the support 1 are relatively short as compared with the arrangement of the invention illustrated in FIGS. 1 and 2.

FIG. 4 illustrates a ball bearing for lengthwise movement in which the radially inwardly opening channels 6 of the support 1 are used for guiding the loaded balls 3 and the radially outwardly opening channels 6 are used for the unloaded balls 4. Cage 2 in this case completely encircles the ball bearing and contributes to the guiding of the unloaded balls 4 in the region of the outwardly opening channels 5. Turnaround or reversing zones (not shown) are formed at the free ends for guiding the balls to or from the radially inwardly opening channels 6. The loaded balls 3 are guided by the lateral walls of the channels 6. The side walls of the channels 6 are slightly inclined with respect to one another and thereby inhibit the balls 3 from falling out therefrom.

The illustrated and described embodiments are only examples of the invention. Further advantageous variations of the rolling bearing for lengthwise movement are possible by use of the corrugated cross-section of the support 1.

What is claimed is:

1. In a rolling bearing for lengthwise movement having circumferentially distributed endless rows of rolling bodies, a support having first axially extending channels in its outer surface, said support radially outwardly supporting the loaded rolling bodies, and a cage for guiding the unloaded rolling bodies in the reverse direction and turning them around at the ends of the support; the improvement wherein the support is deformed to have a corrugated or undulating cross-section in the circumferential direction, the corrugations or undulations extending throughout the axial length of the support and defining second axially extending channels for the rolling bodies.

2. The rolling bearing according to claim 1 wherein the support is comprised of an annular bent sheet metal strip.

3. The rolling bearing according to claim 1 wherein the radially inwardly opening channels of the support define the return guides for the unloaded rolling bodies and the circumferentially directed radially inwardly facing surfaces of the radially outwardly opening channels define races for the loaded rolling bodies.

4. The rolling bearing according to claim 1 wherein the radially outwardly opening channels of the support define return guides for the unloaded balls and the circumferentially directed radially inward surfaces of the radially outwardly opening channels define races for the loaded rolling bodies.

5. The rolling bearing according to claim 1, wherein the radially inwardly opening channels of the support guide the loaded rolling bodies and radially outwardly opening channels guide the unloaded rolling bodies.

6. The rolling bearing according to claim 1 wherein the cage is comprised of two parts joined to one another in a radial plane.

7. The rolling bearing according to claim 6 wherein opposed holding means are arranged on the joined radially extending surfaces of the two parts of the cage.

8. The rolling bearing according to claim 1 wherein the cage has radially extending projections engaging recesses of the support, to inhibit relative rotation of the cage and support.

* * * * *